UNITED STATES PATENT OFFICE.

MARSHALL TURLEY AND GEORGE W. CHAMBERLIN, OF COUNCIL BLUFFS, IOWA.

COMPOSITION OF MATTER FOR PLASTER.

SPECIFICATION forming part of Letters Patent No. 389,724, dated September 18, 1888.

Application filed June 21, 1888. Serial No. 277,835. (No specimens.)

*To all whom it may concern:*

Be it known that we, MARSHALL TURLEY and GEORGE W. CHAMBERLIN, of Council Bluffs, in the county of Pottawattamie and State of Iowa, have invented certain new and useful Improvements in Composition of Matter for Plaster; and we do hereby declare the following to be a full, clear, and exact description of the invention, such as will enable others skilled in the art to which it appertains to make and use the same.

Our invention relates to an improved composition of matter for plastering walls of buildings and for other purposes, one object of the same being to provide a composite plastering material which will possess the properties of adhesion and cohesion in a remarkable degree, be semi-elastic, and consequently not liable to crack, crumble, peel, or fall off of a wall or other surface covered with the compound material.

A further object is to provide a composition for plastering purposes which will be composed of cheap material that will take the place of plastering-mortar made with lime, sand, &c., thus avoiding the use of lime, which in some localities is costly, and afford a more lasting and equally as handsome a finish by a different mixture of ingredients.

With these objects in view our invention comprises the use of certain materials mixed in such proportions as are available for the uses to which it is to be applied, which will be more fully indicated in the formula hereunto appended.

In many parts of the United States, and particularly the West and Southwest, flax is extensively cultivated for its fiber as a textile, and also for the seed, which is ground and converted into oil. The seed pulp and cake resulting from compression when oil is extracted is a comparatively cheap material.

It is well known that limestone is a scarce material throughout large sections of the United States, and consequently where it is scarce its use for plastering purposes is rendered expensive on account of cost of transportation.

In plastering compositions which contain lime as a hardening and bonding ingredient, such compositions are of a crumbling nature and lack cohesion, rendering it necessary to use hair to tie the plaster as a mass together.

By practical experiment we have succeeded in discovering an excellent composition for plastering purposes, of which flaxseed pulp or flaxseed pressed cake, together with pulverized rosin, rosin-oil, clay, and sand, in proper proportions, are combined together. These ingredients are mixed together with water in such volume of the latter as will produce an easy-working mortar, avoiding the use of lime as a bonding material.

We will now give the relative proportions of the materials used which we find give the best results, but do not wish to limit ourselves to the exact quantities named, as a good plastering-mortar may be made if the proportions given in the appended formula are varied from to a certain extent.

*Formula.*—Sand, twenty parts, more or less; oil-cake, two parts, more or less; pulverized rosin, two parts, more or less; clay, two parts, more or less; rosin-oil, one part, more or less; water sufficient to make a free-working mortar.

It is claimed that the plastering compound above named is tough, free from cracking, stronger than ordinary mortar, stands wear and tear without fracture or crumbling, affords a dry wall not pervious to water or air, warm in winter and cool in summer. It is composed of cheap materials easily mixed for use, spreading freely under the trowel, and susceptible of a fine finish with but little labor.

Having fully described our improved composition of matter for plastering purposes, what we claim as new, and desire to secure by Letters Patent, is—

1. The herein-described composition of matter for plastering, consisting of sand, oil-cake, rosin, and clay, combined in suitable proportions with water, for use substantially as set forth.

2. The herein-described composition of matter for plastering, consisting of sand, flaxseed-oil cake, rosin pulverized, clay, and rosin-oil, combined in about the proportions named with hot or cold water, substantially as set forth.

3. The herein-described composition of matter for plastering purposes, consisting of ground flaxseed in pulp or cake, pulverized rosin, sand or a similar substance, strong clay, and rosin-oil mixed with water of sufficient volume to make a free-working mortar, substantially as set forth.

In testimony whereof we have signed this specification in the presence of two subscribing witnesses.

MARSHALL TURLEY.
GEORGE W. CHAMBERLIN.

Witnesses:
J. H. MAYNE,
J. C. LANGE.